(12) United States Patent
Hollander et al.

(10) Patent No.: US 10,239,281 B2
(45) Date of Patent: Mar. 26, 2019

(54) SYSTEM AND METHOD FOR PINNING FIBER MATERIAL

(71) Applicants: Jonathan Worthy Hollander, San Francisco, CA (US); Eric Gregory, Larkspur, CA (US)

(72) Inventors: Jonathan Worthy Hollander, San Francisco, CA (US); Eric Gregory, Larkspur, CA (US)

(73) Assignee: SERIFORGE INC., San Francisco, CA (US)

( * ) Notice: Subject to any disclaimer, the term of this patent is extended or adjusted under 35 U.S.C. 154(b) by 128 days.

(21) Appl. No.: 15/400,638

(22) Filed: Jan. 6, 2017

(65) Prior Publication Data

US 2017/0197399 A1 Jul. 13, 2017

Related U.S. Application Data

(60) Provisional application No. 62/276,600, filed on Jan. 8, 2016.

(51) Int. Cl.
*B32B 41/00* (2006.01)
*B32B 5/02* (2006.01)
*B29B 11/16* (2006.01)
*B29C 70/04* (2006.01)

(52) U.S. Cl.
CPC .............. *B32B 5/02* (2013.01); *B29B 11/16* (2013.01); *B29C 70/04* (2013.01)

(58) Field of Classification Search
CPC ............ B32B 5/02; B29B 11/16; B29C 70/04
USPC ................... 156/60, 64, 350, 351, 378, 379
See application file for complete search history.

(56) References Cited

U.S. PATENT DOCUMENTS

2010/0167039 A1* 7/2010 Choi ..................... B29C 65/564
428/223

* cited by examiner

*Primary Examiner* — Michael N Orlando
*Assistant Examiner* — Joshel Rivera
(74) *Attorney, Agent, or Firm* — Trellis IP Law Group, PC

(57) ABSTRACT

A process to create composite preforms and parts by stacking layers of two-dimensional fiber material (e.g., fiber cloth, fiber reinforced fabric, etc.) having pin-receiving holes and/or gaps disposed between the fibers of the fiber material is described. The stack is pinned together using a subset of pins, such as fiber reinforcing pins, inserted into a subset of the pin receiving holes and/or gaps, leaving at least some of the pin receiving holes and/or gaps available for pinning other layers, as layers of fiber material are added to the stack. As additional layers are added to the stack, different subsets of pins connect the additional layers to the stack, thereby building up the stack. Each layer of fiber material may have a different shape than the other layers and any arbitrary topology, potentially including non-convex and/or disjoint shapes. Furthermore, implementations may produce composite preforms having an arbitrary number of interconnected layers.

20 Claims, 4 Drawing Sheets

SYSTEM AND METHOD FOR PINNING FIBER MATERIAL

CROSS REFERENCES TO RELATED APPLICATIONS

This application claims priority from U.S. Provisional Patent Application Ser. No. 62/276,600, entitled SYSTEM AND METHOD FOR PINNING FIBER MATERIAL, filed on Jan. 8, 2016, which is hereby incorporated by reference as if set forth in full in this application for all purposes.

BACKGROUND

The present invention relates to the field of fiber-reinforced composite materials, and in particular to methods and devices for manufacturing fiber preforms and finished composite products with complicated three-dimensional shapes.

Fiber-reinforced composite materials, referred to herein as composites, are materials comprised of fibers embedded in a matrix material. Typical fibers include but are not limited to glass fibers, carbon fibers (e.g. graphite fibers and/or more exotic forms of carbon, such as carbon nanotubes), ceramic fibers, and synthetic polymer fibers, such as aramid and ultra-high-molecular-weight polyethylene fibers. Typical matrix materials include but are not limited to thermosetting and thermoplastic polymers, such as epoxies, vinylesters, polyester thermosetting plastics, phenol formaldehyde resins, nylon, and PEEK; cement and concrete; metals; and ceramics.

Composite materials often combine high-strength and relatively light weight. In typical composite products, the fibers provide high tensile strength in one or more directions and the matrix material hold the fibers in a specific shape. A set of fibers roughly in the shape of a final product is referred to as a fiber preform. Typical prior fiber preforms are comprised of layers of fibers (often woven or bound into a sheet of fabric) that are cut and arranged into a desired shape. Because fibers and fabrics made from fibers only provide high strength in specific directions, multiple layers of fiber materials are often stacked in different orientations to provide strength and stiffness optimized for the intended usage of the final product.

Most prior composite manufacturing techniques require the production of a mold, mandrel, plug, or other rigid structure in the shape of the desired preform. Sheets of fiber fabric are then cut and arranged on this rigid structure. A matrix material, such as uncured polymer resin, may be embedded in the fiber fabric or applied to the fabric during or after the fabric layup process. The matrix material is then cured or hardened, often under elevated temperature and/or pressure differentials to ensure even distribution of the matrix material and prevent voids, air bubbles, or other internal defects. Pressure and/or temperature may be applied to the composite part during curing using techniques including but not limited to compression molding, vacuum bags, autoclaves, inflatable bladders, and/or curing ovens.

Unfortunately, prior techniques for manufacturing fiber preforms and final composite parts, especially for complex part shapes, are time-consuming and difficult to automate. For example, the cutting and/or arranging fabric in the mold or other rigid structure is often performed by hand, due to the difficulty in draping fabric over complex forms without wrinkles or other surface defects. As a result, composite products are much more expensive than equivalent products made using conventional materials.

Conventional fiber material pinning techniques take a stack of fiber material layers and impress pins through the stack by piercing the layers of the stack with pins, and then securing the pins. Such conventional pinning technique is analogous to stapling material layers together. One method called Z-pinning is a technique that inserts rigid reinforcements, such as metal pins or cured composite rods, (also called Z-pins or Z-fibers) perpendicular to the planes of the fabric layers of an uncured composite preform. Unfortunately, such conventional pinning techniques damage the material fabric when the pins pierce the fiber material layers and are limited to a fixed number of fabric layers and a relatively uniform distribution of Z-pins.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which.

SUMMARY

Exemplary implementations include a system and method for creating a composite preform and parts from a stack of fiber material layers (e.g., fabric layers) interconnected through a pinning process. In one implementation, composite preforms and parts are created from layers of two-dimensional fiber material (e.g., fiber cloth, fiber fabric) pinned together using a subset of pins, such as metal or composite rods. As one or more additional layers are added to the stack, different subsets of pins connect the one or more additional layers to the stack, thereby building up the stack. Each layer of fiber material may have a different shape than the other layers and any arbitrary topology, potentially including non-convex and/or disjoint shapes. Furthermore, implementations may produce composite parts and preforms comprised of any arbitrary number of interconnected layers. In some implementations, the fabric layers include preformed pin receiving holes and/or gaps between the fibers, and the subset of pins are inserted into a subset of the pin receiving holes and/or gaps, leaving at least some of the pin receiving holes available for pinning other layers as layers of fiber material are added to the stack. In other implementations, the pins are inserted through fabric layers, piercing the tows, yarns, or other constituents of the fabric.

Figure 1:
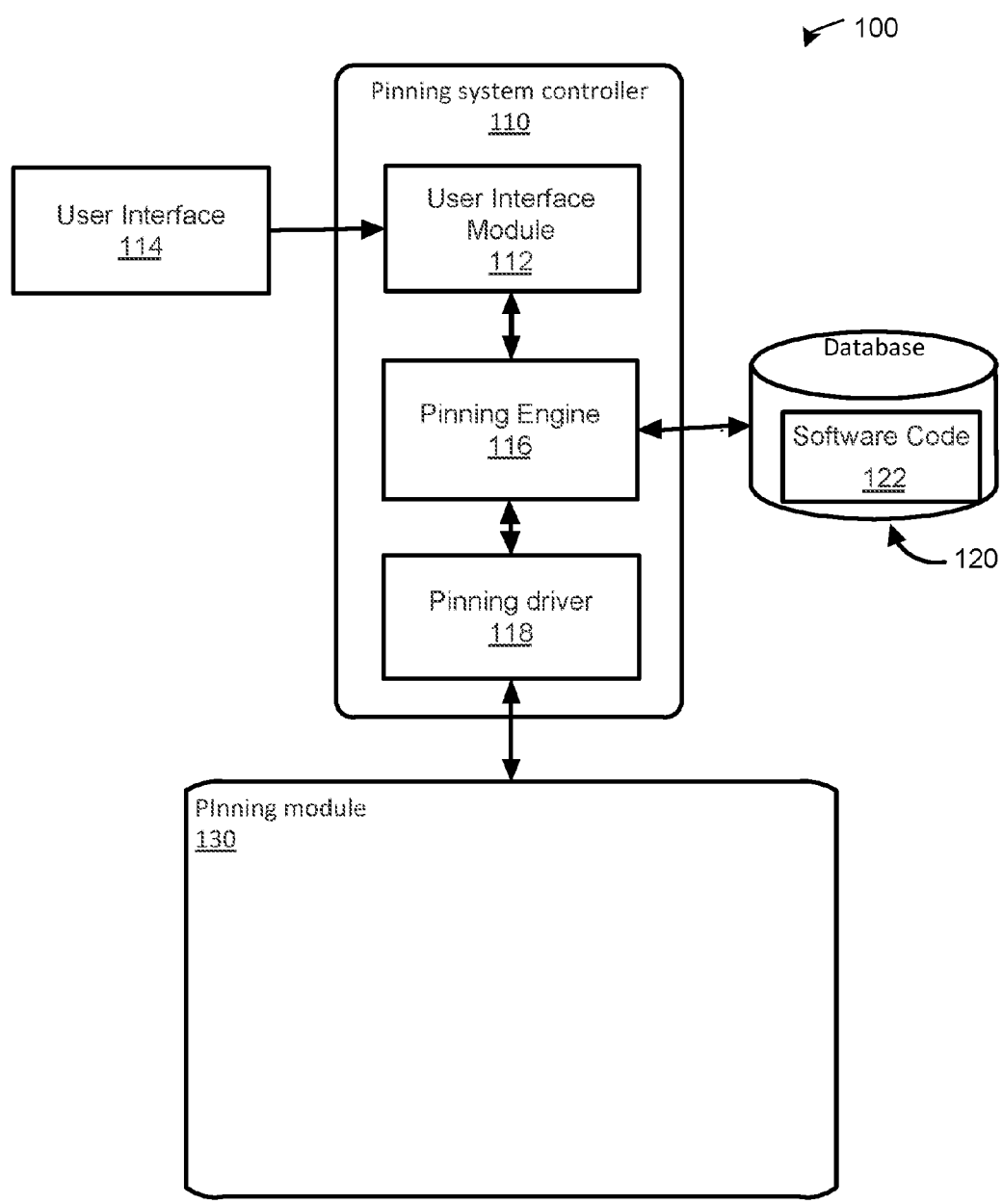
FIG. 1 is a high-level block diagram of an exemplary system used with implementations herein.

FIG. 1 is a high-level block diagram of an exemplary system 100 for pinning layers of fiber material together. As discussed herein, layers of fiber material, which have been cut into cross-section shapes, are formed into a stack where they are connected together using different subsets of fasteners such as reinforcing fiber pins.

System 100 includes pinning system controller 110 configured to process data received from user interface 114, such as a keyboard, mouse, etc., with regard to pinning layers of fiber material (e.g., cloth) together as described herein. System 100 may also include a pinning engine 116 used to process instructions for pinning fiber material together, a pinning driver, used to actuate a pinning module 130 configured to stack and pin layers of fiber material together.

Note that system 100 presents a particular example implementation, where computer software code for implementing embodiments may be implemented, at least in part, on a network of servers which form a cloud data processing network. However, embodiments are not limited thereto. For example, a client-side software application may implement pinning system controller 110, or portions thereof, in accordance with the present teachings without requiring communications between the client-side software application and one or more of the network of servers.

User interface 114 may be any input/output device including keyboards, mouse, and the like adapted to allow a user to view and interact with pinning system controller 110. In other configurations, user interface 114 may be a touch screen display responsive to touches, gestures, swipes, and the like for use in interacting with and manipulating pinning system controller 110 by a user thereof. Gestures may include single gestures, multi-touch gestures, and other combinations of gestures and user inputs adapted to facilitate a user in migrating software code.

In other implementations, system 100 may include one or more database instances 120 such as database instance 120. Database instances 120 may be connected to the pinning system controller 110 directly or indirectly, for example via a network connection, and may be implemented as a non-transitory data structure stored on a local memory device, such as a hard drive, Solid State Drive (SSD), flash memory, and the like, or may be stored as a part of a cloud network, as described herein.

Database instances 120 may contain software code 122 representing software code for pinning layers of fabric material. Software code 122 may include software code and associated data and information as described herein. Software code 122 may also include data pertinent for a process of pinning layers of material fiber cloth such as data structures, data hierarchy, values, summations, algorithms, other types of code, security, hashes, and the like. In addition, software code 122 may also contain other data used for a process of pinning layers of material cloth such as metadata, labels, development-time information, run-time information, API, interface component information, library information, pointers, and the like.

User interface module 112 may be configured to receive and process data signals and information received from user interface 114. For example, user interface module 112 may be adapted to receive and process data from user input associated with pinning layers of fabric material together via pinning module 130.

In an exemplary implementation, pinning engine 116 may be adapted to receive data from user interface 114 and/or database instance 120 for processing thereof. In one configuration, pinning engine 116 is a software engine configured to receive and process input data from a user thereof from user interface 114 in order to pin layers of fiber material together (i.e., fiber material layers).

Pinning driver 118 may be configured to receive pinning data pertaining to pinning module 130, associated software code 122, and other data associated with user interface 114 such as user interface components, icons, user pointing device signals, and the like, used to process layers of fiber material.

In summary, system 100, receives one or more layers of fiber material (e.g., fiber cloth) into pinning module 130. Pinning module 130 stacks cross-section shapes of the fiber material in a defined order, and then joins two or more fiber material layers using pinning, as described in detail below. After the interlayer pinning process is complete for a given subset of cross-section shapes, they become part of a stack of pinned fiber material layers forming partially-completed or completed sections of fiber composite parts, preforms, etc.

FIGS. 2A-F illustrates forming a stack of fiber material using a three-dimensional pinning process pinning fiber material layers together using different subsets of pins inserted into and through fiber material, and securing the pins in order to form composite structures, preforms, products, and the like with varying cross-sectional topology according to implementations described herein.

In some embodiments, fabric layers include pin-receiving holes that are aligned as the fabric layers are stacked, so that pins can be inserted through multiple fabric layers by passing through their respective holes. In some implementations of these embodiments, the pin-receiving holes are formed as part of the fabric formation process. For example, one embodiment may utilize fabric with an open weave pattern that leaves space between all or a portion of the warp and/or weft fibers. In additional embodiments, the open weave pattern may lock some or all of the fibers in relatively fixed position, so that pin-receiving holes have consistent size and locations. Leno weave patterns are an example of this type of open weave patterns. In alternate embodiments, the fabric may be a non-crimp fabric with fibers stitched, knitted, or bonded together, with spacing between fibers to form pin-receiving holes. As described herein, pre-formed pin-receiving holes may be virtually any opening shape, size, and dimension that may be used to advantage. Moreover, different sizes and shapes may be combined such that a fiber material layer may include a variety of pin-receiving holes that may or may not be uniform in size and shape.

In addition, one or more groups of pin-receiving holes may form patterns. Any pattern may be used. For example, a group of pin-receiving holes may form a stich pattern, square pattern, round pattern, rectangular pattern, triangular pattern, hexagonal pattern, or any other pattern symmetric under rotation and/or translation, or an arbitrary non-tessellating pattern specific to the type of part being fabricated. Patterns may be uniform or non-uniform, and a combination of patterns may be used.

In addition, the density of pin-receiving holes (i.e., spacing between pin-receiving holes) within fiber material layers may vary. For example, some sections of fiber material layers may have a higher density of pin-receiving holes per square area than other sections of the fiber material.

In exemplary implementations, different densities, shapes, and/or groups of pin-receiving holes may be used individually or combined to provide for structural design parameters of the stack, such as strength, ductility, shear strength, and the like. For example, the pattern of a group of pin-receiving holes may be specified with uniform shapes, or as random or pseudo-random shapes, to effectuate structural design parameters.

In other implementations, in addition to or in lieu of pin receiving holes 208, pin insertion paths 209 may be formed using gaps formed between and/or within the fibers of the fiber material layers (e.g., fiber material layers 204, 206, etc.). Such gaps may be formed as part of the fabric formation process using, for example, an open weaving process which intrinsically forms such gaps. In other implementations, such gaps may be formed within the fibers themselves, as part of a natural or predefined gap formation processes. Moreover, in some implementations, such gaps may be formed using natural or designed fiber shapes, such that fibers are shaped to form gaps when disposed adjacent to one another.

In still further implementations, the pins are inserted through the material of fabric layers, piercing the tows, yarns, fibers, or other constituents of the fabric, in addition or in lieu of passing through pin receiving holes or gaps between fibers.

Figure 2A:
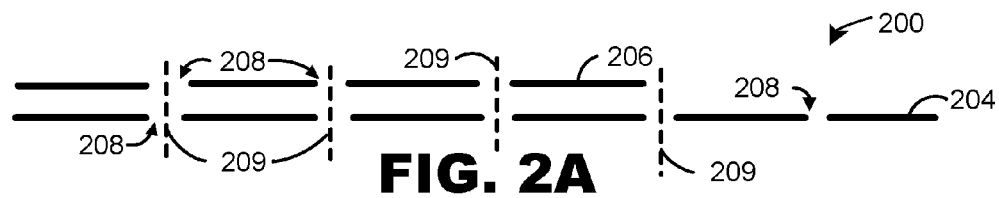
FIGS. 2A-2F are high-level diagrams illustrating an exemplary fiber material pinning process used with implementations herein.

FIG. 2A illustrates one implementation where a stack 200 of fiber material is formed. Fiber material layer 204, which may optionally include preformed pin-receiving holes or gaps in the fabric 208, is positioned as a first layer of stack 200. Fiber material layer 206, which also may optionally include preformed pin-receiving holes 208, is positioned over fiber material layer 204 to form a second layer of stack 200. In embodiments including pin-receiving holes or gaps between fibers, the position of fiber material layer 206 is adjusted to axially position pin-receiving holes 208 of fiber material layer 204 relative to pin-receiving holes 208 of fiber material 206 to form pin insertion paths 209 through fiber material layers 204 and 206.

Figure 2B:
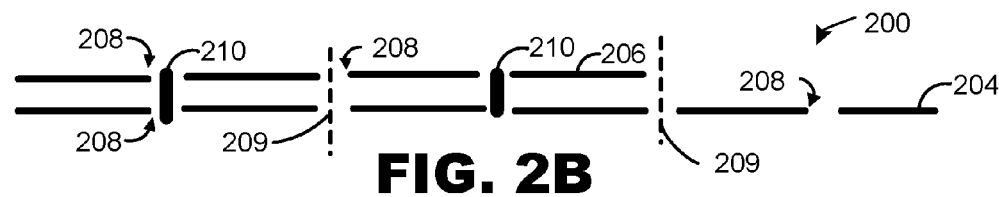

FIG. 2B illustrates one implementation where stack 200 is pinned. In embodiments including pin-receiving holes, pins 210 are inserted in a subset of pin-receiving holes 208 and secured to pin fiber material layer 204 and fiber material layer 206 together while leaving at least some pin insertion paths 209 open. In further embodiments, at least some of the pins 210 are inserted through the material of the fabric layers 204 and 206, piercing the tows, yarns, fibers, or other constituents of fabric layers. Pins 210 may be of any type of material, including carbon, glass, boron, aramid, or other types of polymers; metals; and ceramics. Pins 210 may also include combinations of materials, including cured and uncured composites. Pins 210 may have a variety of shapes, including round and rectangular profiles, and may optionally include geometric features for piercing fabric, such as sharpened ends, and/or retaining fabric layers, such as barbs.

Figure 2C:
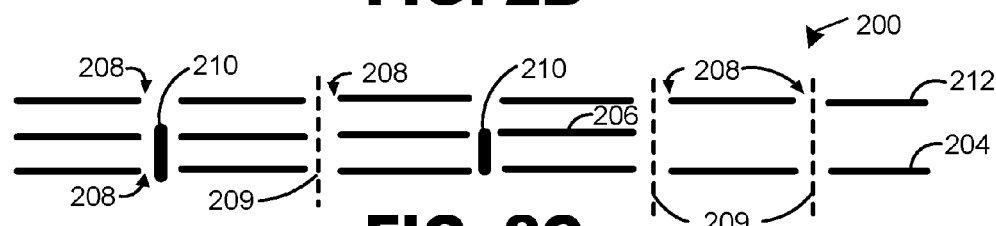

FIG. 2C illustrates one implementation where stack 200 is modified. In one implementation, fiber material layer 212, which optionally includes preformed pin-receiving holes 208, is positioned over fiber material layer 206 to form a third layer of stack 200. The position of fiber material layer 212 is configured to align with fiber material layers 210 and 206. In embodiments including pin-receiving holes, the pin-receiving holes of fiber material layer 212 are aligned with the pin-receiving holes 208 of fiber material 206 forming open pin insertion paths 209 through some or all of the three fiber material layers 204, 206, and 212. In some implementations, only some available pin-receiving holes 208 (i.e., pin-receiving holes that do not have pins) of fiber material layers 204, 206, and 212 need be aligned in order to pin fiber material layer 212 to stack 200 via fiber material layer 206.

Figure 2D:
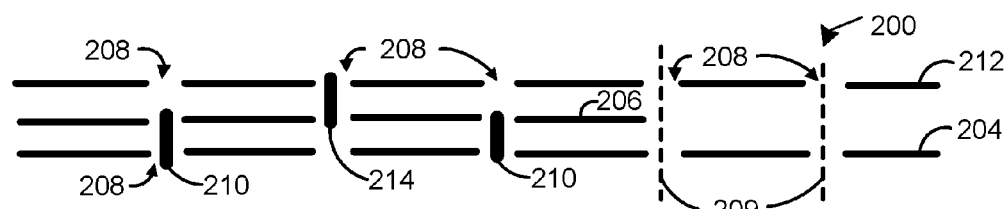

FIG. 2D illustrates one implementation where stack 200 as modified by fiber material layer 212 is pinned. In implementations including pin-receiving holes, pins 214 are inserted into and through a subset of pin-receiving holes 208 that are open forming pin insertion paths 209 between some or all of the fiber material layers 204, 206 and 212. In other embodiments, at least some of the pins 210 are inserted through the material of the fabric layers 204 and 206, piercing the tows, yarns, fibers, or other constituents of fabric layers. Pins 214 may be secured to pin fiber material layer 212 to fiber material layers 204 and/or 206. While pins 214 are shown pinning fiber material layers 206 and 212 together, other configurations may be used. For example, pins 214 may be used to pin fiber material layers 204 to 212, or layer 206 to layer 212, or pin all three fiber material layers 204, 206, and 212 together.

Figure 2E:
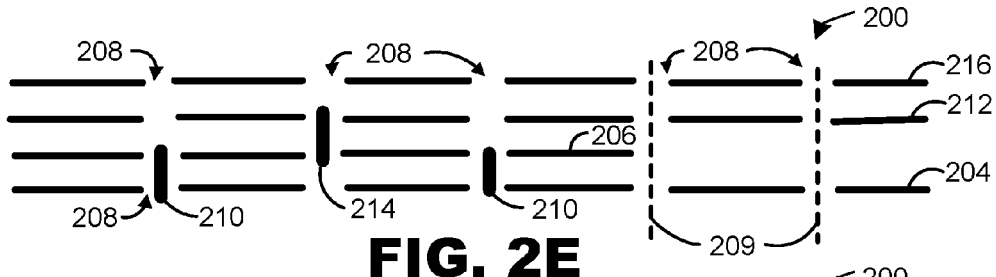

FIG. 2E illustrates one implementation where stack 200 is modified by adding a layer of fiber material to stack 200. In one implementation, fiber material layer 216, which optionally includes preformed pin-receiving holes 208, is positioned over fiber material layer 212 to form a fourth layer of stack 200. The position of fiber material layer 216 is configured to align with fiber material layer 212. If pin-receiving holes are included, then pin-receiving holes 208 form at least some open pin insertion paths 209 through all or some of the four fiber material layers 204, 206, 212, and 216.

Figure 2F:
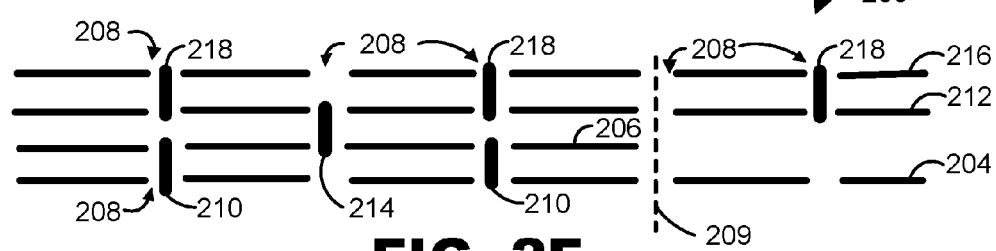

FIG. 2F illustrates one implementation where stack 200 is modified by pinning fiber material layer 216 to stack 200. In one implementation, pins 218 are inserted through fiber material layers 204, 206, and 212, via a subset of the pin-receiving holes 208 or through the fabric material itself. Pins 218 may be secured to pin fiber material layer 216 to some or all of the fiber material layers 204, 206, and 212. While pins 218 are shown pinning fiber material layers 216 and 212 together, other configurations may be used. For example, pins 218 may be used to pin fiber material layer 216 to layer 204, or layer 216 to layer 212, layer 216 to 206, or pin all, or a combination of the four fiber material layers 204, 206, 212, and 216 together.

Figure 3:
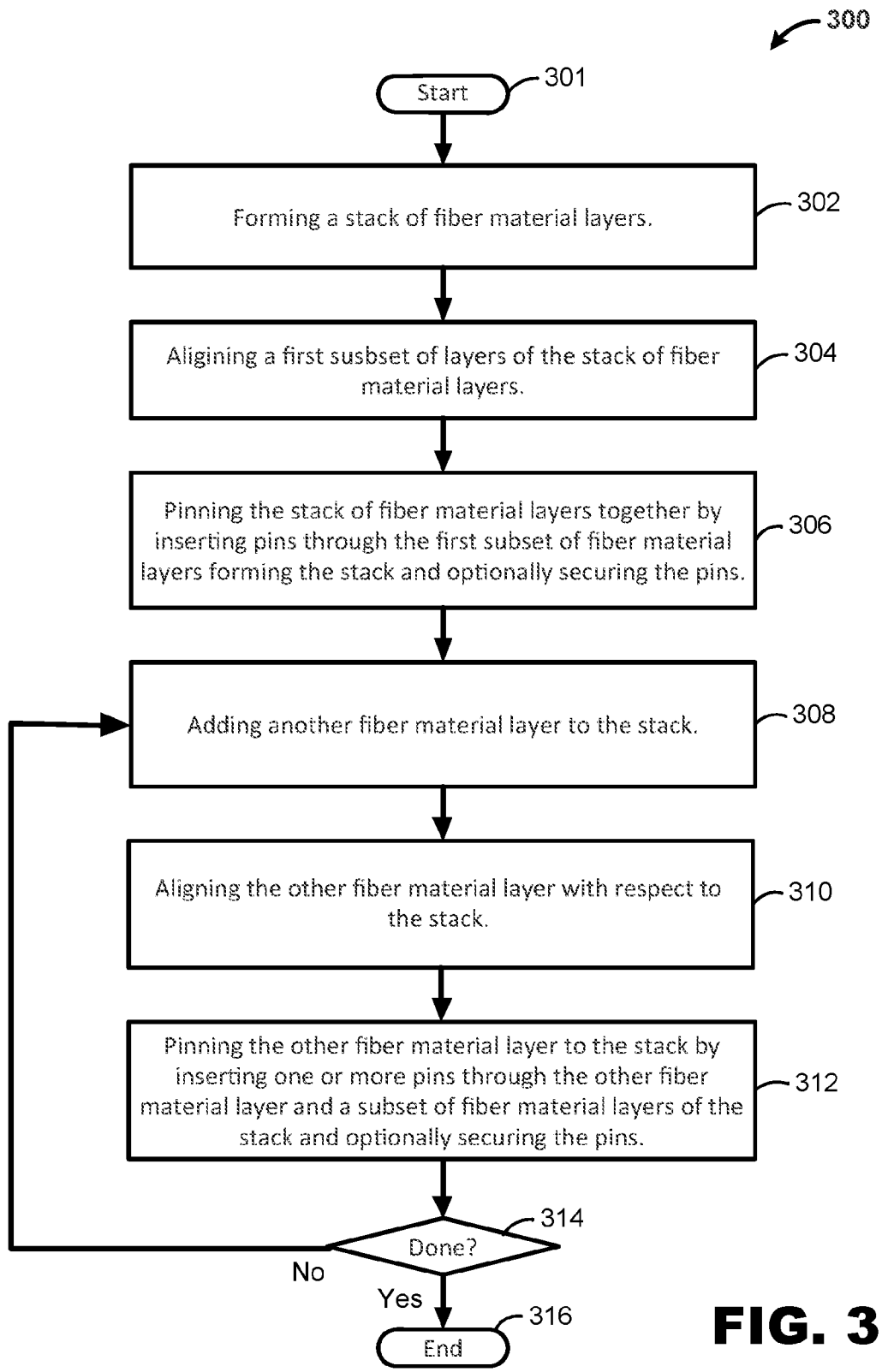
FIG. 3 is a flow diagram of an example method adapted for use with implementations, and variations thereof, illustrated in FIGS. 1-2.

FIG. 3 is a flow diagram of an example method 300 adapted for use with implementations, and variations thereof, illustrated in FIGS. 1-2. Method 300 may be entered into at 301 for example by initiating system 100 to form stack 200 from a plurality of fiber material layers as described herein.

At 302, two or more fiber material layers are positioned relative to each other in order to form a first set of layers of stack 200. As described herein, each of the fiber material layers may optionally include one or more pin receiving holes or gaps between fibers disposed therein. The optional pin-receiving holes or gaps between fibers are configured to receive a pin.

At 304, the two or more fiber material layers are positioned and aligned relative to one another in order to align two or more fiber material layers. If pin-receiving holes are present, the pin-receiving holes are aligned to create pin insertion paths for pins to be inserted into, and through, one or more axially aligned pin-receiving holes of the two or more fiber material layers.

At 306, the two or more fiber material layers are pinned together by inserting one or more pins. Pins may be mechanically, adhesively, frictionally, or otherwise secured to the fabric layers. In other implementations, the pins may not be secured.

At 308, an additional fiber material layer is positioned relative to the stack. The additional fiber material layer may optionally include a plurality of pin-receiving holes disposed therein.

At 310, the added fiber material layer is positioned and aligned with the two or more fiber material layers. If pin-receiving holes are present, then these holes or gaps may be aligned to create or modify pin insertion paths for pins to be inserted into and through the two or more fiber material layers and the added fiber material layer.

At 312, the two or more fiber material layers and additional layer are pinned together by inserting pins.

At 314, method 300 determines whether one or more fiber material layers are to be added to the stack. If so, method 300 returns to 308. If not, method 300 ends at 316.

Although the description has been described with respect to particular embodiments thereof, these particular embodiments are merely illustrative, and not restrictive.

Figure 4:
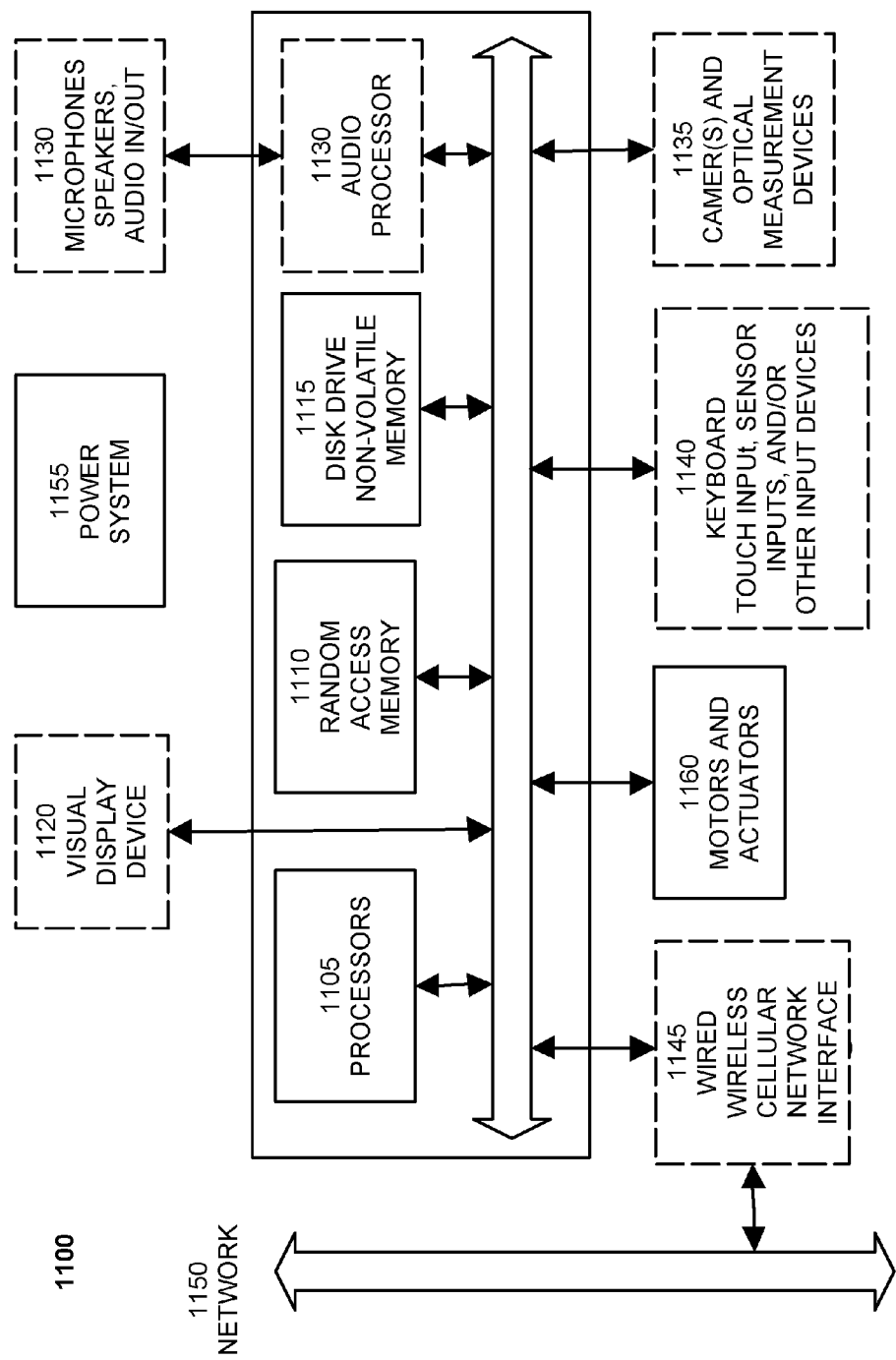
FIG. 4 is a high-level block diagram of an exemplary computer and communication system.

FIG. 4 illustrates a computer system suitable 1100 for controlling a system for three-dimensional weaving of composite preforms and products with varying cross-sectional topology according to an embodiment of the invention. The computer system 1100 includes one or more general purpose or specialized processors 1105, which can include microprocessors, microcontrollers, system on a chip (SoC) devices, digital signal processors, graphics processing units (GPUs), ASICs, FPGAs and other programmable logic devices, and other information processing devices. The computer system 1100 also includes random access memory 1110 and non-volatile memory 1115, such as a magnetic or optical disk drive and/or flash memory devices.

The computer system 1100 may optionally include one or more visual display devices 1120. The computer system 1100 may also optionally include an audio processor 1125 for generating and receiving sound via speakers, microphone, or other audio inputs and outputs 1130; and optional sensors and input devices 1140 such as keyboards; scroll wheels; buttons; keypads; touch pads, touch screens, and other touch sensors; joysticks and direction pads; motion sensors, such as accelerometers and gyroscopes; global positioning system (GPS) and other location determining sensors; temperature sensors; such as mechanical, optical, magnetic or other types of position detectors and/or limit switches for detecting the current positions of the various components of the above-described systems; voltage, current, resistance, capacitance, inductance, continuity, or any other type of sensor for measuring electrical characteristics of the various components of the above-described systems; force, acceleration, stress or strain, and/or tension sensors; and/or any other type of input device known in the art. Computer system 1100 may optionally include one or more cameras or other optical measurement devices 1135 for capturing still images and/or video.

The computer system 1100 may also include one or more modems and/or wired or wireless network interfaces 1145 (such as the 802.11 family of network standards) for communicating data via local-area networks 1150; wide-area networks such as the Internet; CDMA, GSM, or other cellular data networks of any generation or protocol; industrial networks; or any other standard or proprietary networks. The computer system 1100 can also include a peripheral and/or data transfer interface, such as wired or wireless USB, IEEE 1394 (Firewire), Bluetooth, or other wired or wireless data transfer interfaces.

The computer system 1100 can include a power system 1155 for obtaining electrical power from an external source, such as AC line current or DC power tailored to the computer system 1100 via an external power supply, as well as one or more rechargeable or one-time use batteries, fuel cells, or any other electrical energy generation device. Additionally, power system 1155 may provide energy in the form of compressed gas, vacuum, and/or hydraulic systems to power various actuators and components of embodiments of the invention.

Computer system 1100 may be implemented in a variety of different form factors, including desktop and laptop configurations as well as embedded and headless forms.

Embodiments of the invention use a variety of motors and actuators, such as brushed or brushless DC motors, AC synchronous and induction motors, stepper motors, servomotors, solenoids, and/or pneumatic and hydraulic actuators. In an embodiment, computer system 1100 include motor and actuator controls 1060 for providing power and control signals to these motors and actuators.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of producing a fiber composite preform, the method comprising:
stacking a first set of fiber material layers;
aligning the first set of fiber material layers;
determining a plurality of pin insertion points along the first set of fiber material layers, wherein the pin insertion points include at least some pin insertion points configured to receive pins for the first set of fiber material layers and other pin insertion points configured to remain open to receive or pass pins through a second set of fiber material layers formed by adding at least one additional fiber material layer to the first set of fiber material layers;

inserting a first subset of pins through the first set of fiber material layers at the at least some pin insertion points;

positioning the additional fiber material layer relative to the stack;

aligning the additional fiber material layer relative to the stack; and inserting a second subset of pins through at least a portion of the first set of fiber material layers and the additional fiber material layer at the other pin insertion points to form a pinning structure for the second set of fiber material layers.

2. The method of claim 1, wherein inserting the first subset of pins comprises inserting the first subset of pins through a group of pin-receiving holes.

3. The method of claim 2, wherein the group of pin-receiving holes comprises a variable density.

4. The method of claim 2, wherein the group of pin-receiving holes comprises a density shape configured as a structural element of the fiber composite preform.

5. The method of claim 4, wherein the density shape comprises a pseudo-random shape.

6. The method of claim 1, wherein inserting the first subset of pins comprises inserting the first subset of pins through gaps disposed in the first set of fiber material layers and the additional fiber material layer.

7. The method of claim 6, wherein the gaps are formed within fibers of the first set of fiber material layers and the additional fiber material layer.

8. The method of claim 6, wherein the gaps are formed between fibers of the first set of fiber material layers and the additional fiber material layer.

9. The method of claim 1, wherein inserting the first subset of pins comprises piercing the first set of fiber material layers and the additional fiber material layer with at least some of the first subset of pins.

10. The method of claim 9, wherein inserting the second subset of pins through at least the portion of the first set of fiber material layers and the additional fiber material layer comprises piercing the portion of the first set of fiber material layers and the additional fiber material layer with at least some of the second subset of pins.

11. A system for producing a fiber composite preform, the system comprising mechanisms, motors and sensors performing:

stacking a first set of fiber material layers;

aligning the first set of fiber material layers;

determining a plurality of pin insertion points along the first set of fiber material layers, wherein the pin insertion points include at least some pin insertion points configured to receive pins for the first set of fiber material layers and other pin insertion points configured to remain open to receive or pass pins through a second set of fiber material layers formed by adding at least one additional fiber material layer to the first set of fiber material layers;

inserting a first subset of pins through the first set of fiber material layers at the at least some pin insertion points;

positioning the additional fiber material layer relative to the stack;

aligning the additional fiber material layer relative to the stack; and inserting a second subset of pins through at least a portion of the first set of fiber material layers and the additional fiber material layer at the other pin insertion points to form a pinning structure for the second set of fiber material layers.

12. The system of claim 11, wherein inserting the first subset of pins comprises inserting the first subset of pins through a group of pin-receiving holes.

13. The system of claim 12, wherein the group of pin-receiving holes comprises a variable density.

14. The system of claim 12, wherein the group of pin-receiving holes comprises a density shape configured as a structural element of the fiber composite preform.

15. The system of claim 14, wherein the density shape comprises a pseudo-random shape.

16. The system of claim 11, wherein inserting the first subset of pins comprises inserting the first subset of pins through gaps disposed in the first set of fiber material layers and the additional fiber material layer.

17. The system of claim 16, wherein the gaps are formed within fibers of the first set of fiber material layers and the additional fiber material layer.

18. The system of claim 16, wherein the gaps are formed between fibers of the first set of fiber material layers and the additional fiber material layer.

19. The system of claim 11, wherein inserting the first subset of pins comprises piercing the first set of fiber material layers and the additional fiber material layer with at least some of the first subset of pins.

20. The system of claim 19, wherein inserting the second subset of pins through at least the portion of the first set of fiber material layers and the additional fiber material layer comprises piercing the portion of the first set of fiber material layers and the additional fiber material layer with at least some of the second subset of pins.

* * * * *